Sept. 20, 1955 R. C. CARLSON 2,718,401

PHONOGRAPH RECORD CHANGER

Filed May 10, 1949 4 Sheets-Sheet 1

INVENTOR.
REUBEN C. CARLSON
BY
J. D. Douglas
his atty.

Sept. 20, 1955 R. C. CARLSON 2,718,401

PHONOGRAPH RECORD CHANGER

Filed May 10, 1949 4 Sheets-Sheet 2

INVENTOR.
REUBEN C. CARLSON
BY J. D. Douglass
his atty.

Sept. 20, 1955 R. C. CARLSON 2,718,401

PHONOGRAPH RECORD CHANGER

Filed May 10, 1949 4 Sheets-Sheet 3

INVENTOR.
REUBEN C. CARLSON
BY
J. D. Douglas
his atty.

Sept. 20, 1955 R. C. CARLSON 2,718,401

PHONOGRAPH RECORD CHANGER

Filed May 10, 1949 4 Sheets-Sheet 4

INVENTOR.
REUBEN C. CARLSON
BY
J. D. Douglas
his atty 2,718,401
Patented Sept. 20, 1955

2,718,401

PHONOGRAPH RECORD CHANGER

Reuben C. Carlson, Chicago, Ill., assignor to Admiral Corporation, Chicago, Ill., a corporation of Delaware Application May 10, 1949, Serial No. 92,313

4 Claims. (Cl. 274—10)

This invention relates to automatic record changers, and more particularly to an improvement of a record changer, whereby it may be adapted to play three sizes of records.

In the past, automatic record changers were adapted to play only two sizes of records, namely, those of 10-inch and 12-inch diameter. However, with the advent of a third size record for playing at slow rotative speed, it has become necessary to evolve new methods of changer operation to adapt a changer to handle not only the ten and twelve inch records but the seven inch as well.

In a copending application, Ser. No. 55,801, filed October 21, 1948, by James E. Vistain, Jr., now U. S. Patent No. 2,695,786, a record changer was disclosed for the standard ten and twelve inch records which was less expensive to manufacture and at the same time simpler to service. By my present invention, I have modified this changer to adapt it for use with the seven inch record in addition to the others. The changeover from the larger to smaller records can be quickly and easily accomplished, and the mechanism still partakes of the same ease of manufacture and servicing as in the embodiment disclosed in the aforesaid copending application.

A more complete understanding of the invention may be had by reference to the following figures and description which form a part of this specification.

Figure 1:
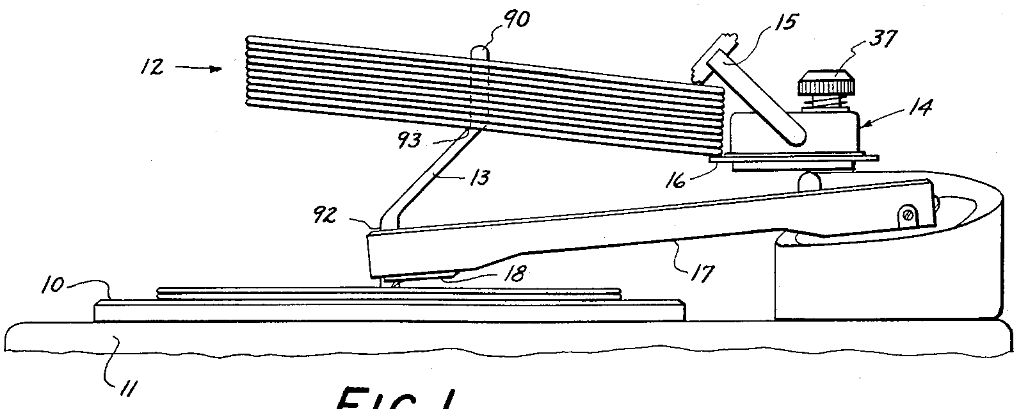
Fig. 1 is a side elevational view of my invention arranged to play the seven inch records.

In adapting a record changer to play a record of different size, two problems are encountered; the magazine must be altered to support the alternate size of record, and the operating mechanism for the pickup arm must be adjusted so that the needle will engage the starting groove of the record when it is lowered into position. My invention accomplishes these adjustments by a simple change of spindle for the record player.

Briefly, my invention comprises an alternate spindle for the changer of the aforesaid copending application, which spindle has an extended lower end. This lower end, when the spindle is inserted, engages and moves a lever and thereby, acting through a linkage, moves a tone arm stop latch to change the indexing or stopping position of the pickup arm and position it properly for engagement with a smaller record.

More specifically, and with reference to the figures, my invention comprises a record changer having the usual turntable 10 supported in the base 11 and driven by a motor not shown. This drive may be any of the customary types, and forms no part of the present invention. A stack of records 12 is supported above the turntable 11 by a magazine comprising a spindle 13 supporting the records at their center holes, and an ejector head 14 supporting them at one edge. A spring loaded pressure arm 15 is customarily provided to keep the records in firm contact with the supporting plate 16 of the ejector head. Any usual type pickup arm 17 may be provided to carry the pickup 18 which is effective to reproduce the music impressed in the record being turned on the turntable.

The operation of this type of changer is well known to those skilled in the art. However, as described in the aforesaid copending application, I have made an improved and simplified operating mechanism. The mechanism used in my present invention is nearly identical, and the operation is, in all respects, the same as that described therein.

The ejecting means for the record is the same as there shown comprising a driven cam 20 (Fig. 2) carrying a link 21 pivoted thereto on a rivet or post 22. This link, when moved by the cam causes a crank arm 23 to oscillate which, in turn, slides the lowermost record of the supported records 12 off of its supports and allows it to drop onto the turntable.

The unique switch 25 described in the copending application has been shown retained here, although it is no longer effective to turn off the changer when the last record has been played for the present embodiment does not carry the control link there described. It is apparent, therefore, that any switch arrangement could be substituted for the one shown, and that my invention is completely independent of the type of ejector head or switch used.

Figure 2:
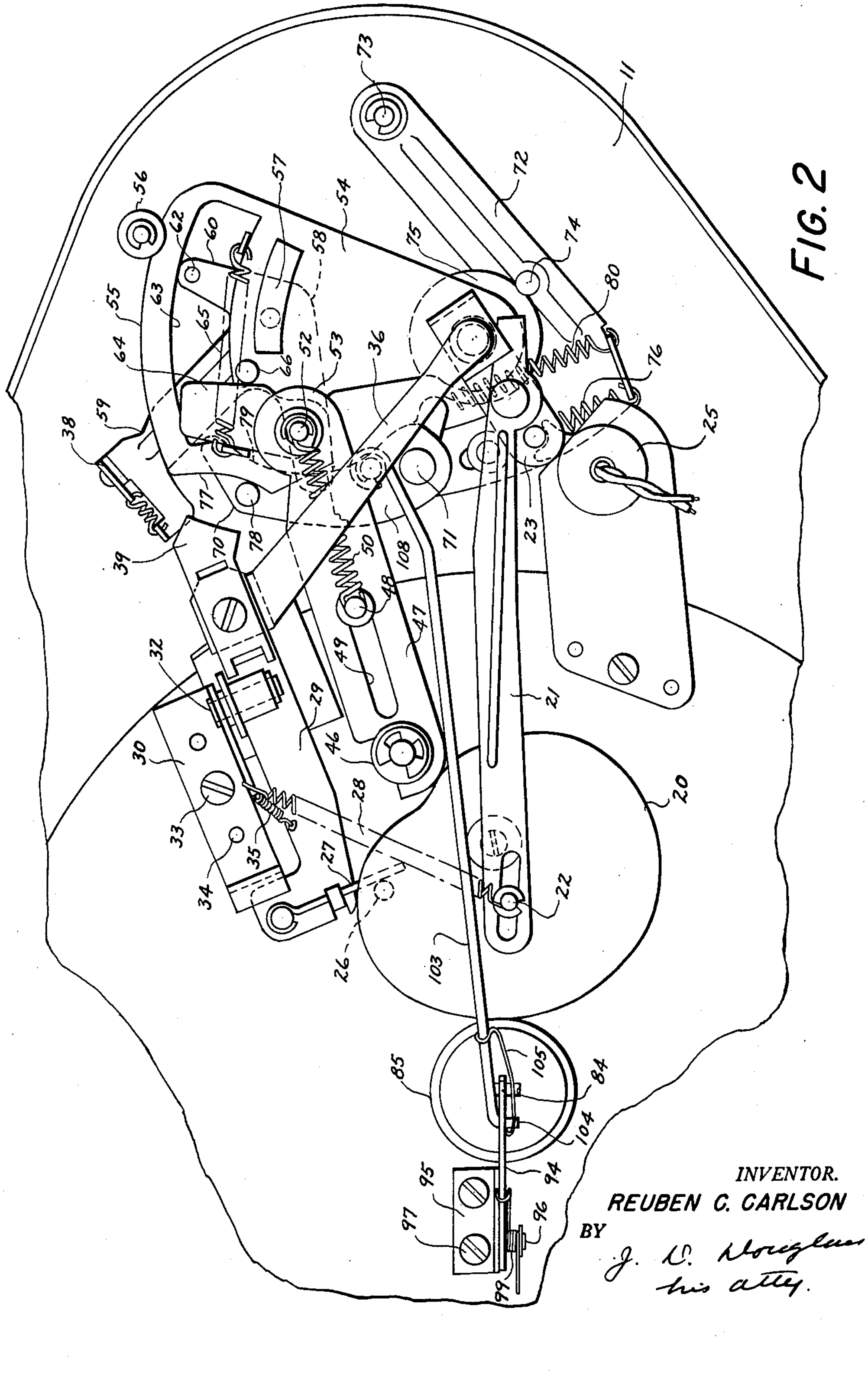
Fig. 2 is a bottom view of my invention.

The trip mechanism is also the same as described in the aforesaid copending application. As best shown in Fig. 2, it comprises a post 26 on the cam 20, which is held by a finger 27 against the urging of the spring 28. The finger 27 is movably supported by a rocking lever 29 pivotally mounted on a bracket 30 by a stud 32. The bracket 30 is fixed to the base 11 by a screw 33 and held more firmly in place by dimples 34. A spring 35 serves to hold the finger 27 normally in a position to be engaged by the post 26. It may be rocked out of engagement by the moving of an arm 36 manually from the reject button 37 or by the engagement of a pawl 38 with the end 39, of the lever 29. This latter action results when the pickup reaches the runout groove of a record on the turntable.

When the cam 20 is thus released, the spring 28 starts it rotating. This is sufficient to initiate a driving relationship between the hub 40 of the turntable and a wheel 42 carried on a common axle 43 with the cam 20. The axle 43 is suitably journalled in a bearing 44 mounted on the base 11. A rubber tire 45 is provided for the wheel 42 in order that the drive may be quiet and yet firm.

The cam 20 upon rotating engages a roller type follower 46 rotatably journalled on a sliding member 47. This member slides on a pin 48 mounted on the base 11 and extending through a slot 49 in the member and is urged toward the cam 20 by a spring 50 which engages the pin 48 and a post 52 at the end 53 of the member 47 away from the follower. The post 52 is mounted on a control plate 54 and is journalled in the end 53 of the sliding member 47. It will be seen that the motion of the follower 46 is therefore transmitted to the plate 54. The plate 54 is pivotally mounted on the base 11 at the same place as is the crank arm 23 and, therefore, its motion is arcuate about that point. It is further supported at its outer edge 55 by a grooved post 56 mounted on the base 11.

This control plate 54 provides the means for moving the pickup arm 17 automatically. A cam surface 57 struck upwardly from the plate engages a post not shown to rock the pickup arm vertically. The horizontal movement of the arm is controlled by a spider 58 having three arms. The center arm 59 carries the pawl 38 and is positioned so that the pawl will engage the lever 29 when the pickup reaches the runout groove as previously explained. A second arm 60 carries a post 62 which extends through a large arcuate slot 63 in the control plate 54.

Figure 3:
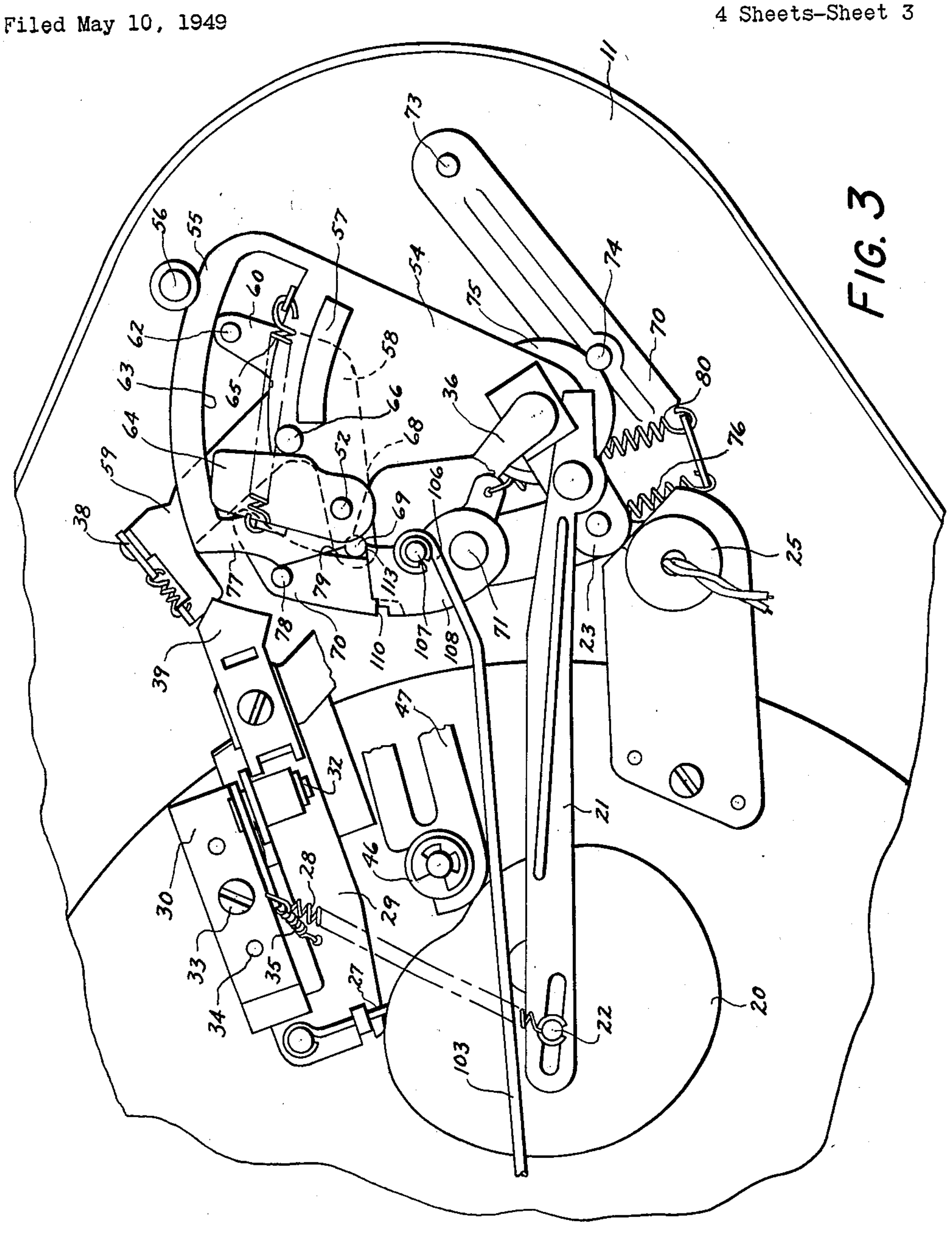
Fig. 3 is a partial view similar to Fig. 2 with some parts removed.

A safety arm 64 is pivoted to the plate 54 at the pin 52 and covers a portion of one end of the slot 63 in position to engage the post 62. The safety arm 64 is biased toward the post 62 by a spring 65, engaging the arm 64 and plate 54, but is held by a stop 66 from rotating beyond its dseired position as shown in Figs. 2 and 3. At the beginning of the change cycle, the spider is at its furthest counter-clockwise position (Figs. 2 and 3), and then the plate 54 is moved clockwise by the action of the cam 20 and slide member 47. The safety arm 64 then engages the post 62 and swings the spider 58 and the pickup arm 17 with it back off the record. The safety arm 64 merely allows the pickup arm to be displaced from its controlled position against the urging of the spring 65.

Figure 6:
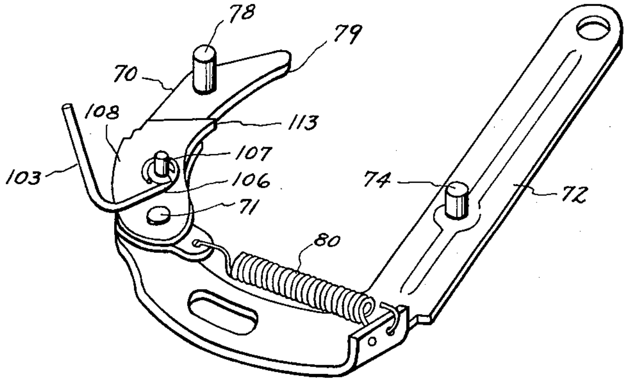
Fig. 6 is a perspective view of the new tone arm indexing mechanism of my invention.

The third or positioning arm 68 of the spider 58 also carries a post 69 (Fig. 3) somewhat shorter than the post 62 so that it may pass over the plate 54. This post 69 is adapted to be engaged by the positioning lever 70. This lever 70 is pivoted to an L shaped member 72 by a pin 71, as is best shown in Fig. 6, which, in turn, is pivoted to the base 11 of the changer by a rivet or stud 73. The member 72 carries a post 74 which engages a cam 75 controlled by the position of the ejector head for either of the ten or twelve inch records. This cam 75 adjusts the positioning lever so that the pickup arm 17 will be in a proper starting position for either of the two larger sizes, as will be explained, and as more completely described in my aforesaid copending application. The post 74 is held against the cam 75 by the action of a spring 76.

The positioning lever 70 is normally held out of engagement with the post 69 on the positioning arm 68 by the engagement of a cam surface 77 on the control plate 54 with a post 78 on the lever 70. Thus it can be seen that, normally, the spider, and therefore the pickup arm, are free to follow the grooves in the record. However, during the change cycle, the plate is withdrawn and the post 78 is disengaged from the cam surface, whereupon an inner cam surface 79 on the lever 70 engages the post 69. This engagement is kept firm by the action of a spring 80 which is not so strong, however, as the spring 65 on the safety arm 64. Therefore, the spider 58 will be moved outward (clockwise in Fig. 2) during the clockwise motion of the control plate 54 and will be brought back in a counterclockwise direction by the urging of the cam surface 79 on the post 69 when the movement of the plate 54 is reversed. This counterclockwise movement of the spider is halted by the engagement of the post 69 with a stop notch on the positioning lever 70, whereupon the pickup arm 17 is lowered by its cam 57 into playing position on the record.

The entire foregoing explanation of the action of my player is included here merely for the sake of a better understanding of my invention, and the exact structure and its action is more completely described in the copending application of James E. Vistain, Jr., Ser. No. 55,801, filed October 21, 1948, as aforesaid.

It is apparent that, since the ejector head 14, and therefore the cam 75, have only two positions in the above described embodiment, the stop notch could have only two positions, and the pickup arm would thus be lowered in either of two positions, namely, at the starting groove of either a ten inch or twelve inch record.

My invention, in addition to adapting the supporting magazine to hold a smaller size record, also provides a third position of the stop notch so that the pickup arm will be properly lowered in place for the playing of the small record.

Figure 4:
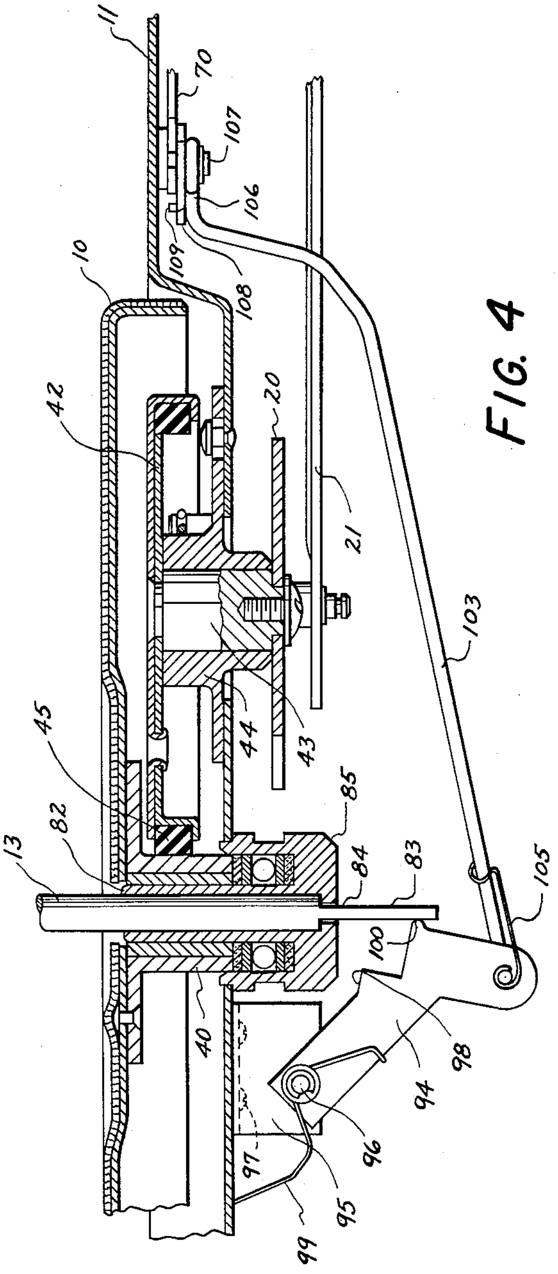
Fig. 4 is a sectional view from line 4—4 of Fig. 2, some parts being omitted for clarity.

The adaptation of the magazine to the smaller records is accomplished by a change of spindle. As is best shown in Fig. 4, the spindle 13 extends through a sleeve 82 on which the turntable is journalled. The lower end of the spindle is formed with a substantially rectangular tongue 83 extending therefrom through a rectangular opening 84 in the bottom of the turntable bearing mount 85 which is also described in my aforesaid application. However, below this mount instead of the automatic switch cut-off mechanism as there described, I now provide a means for changing the position of the stop notch which will be described hereinafter.

Figure 5:
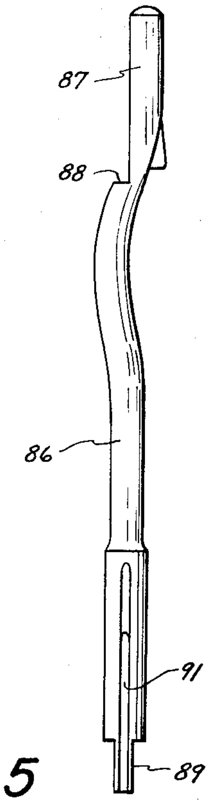
Fig. 5 is a view of the alternate spindle for use in playing ten and twelve inch records.

For playing the ten or twelve inch record, I provide a spindle 86 of ordinary formation as best shown in Fig. 5. This spindle has the usual upper magazine portion 87, and support ledge 88. The rectangular tongue 89 at its base is comparatively short, being just long enough to be inserted into the opening 84 and to prevent the spindle from turning. This spindle may be held in place by a wire spring 91 in the side of the spindle in position to engage the opening 84 when the spindle is in place. When this spindle is in place, the other parts of the changer are in the positions as shown in Figs. 2 and 6, and the action of the changer is as described in the aforesaid copending application.

For playing the smaller records, I provide a spindle 12 with a much larger offset between the upper magazine portion 90 and the playing portion 92. This offset is sufficient that the seven inch record may be supported by the ledge 93 and the support plate 16 of the ejector head. This spindle also has a much longer tongue 83 at its base which engages the aforesaid means for changing the position of the stop notch.

This means comprises a pivoted lever 94 pivoted to a bracket 95 by a rivet 96. The bracket 95 may be fixed to the base 11 by any convenient means such as screws 97. In the position for playing of the larger sizes of records, with the short tongued spindle 86 in place, the lever 94 rests against the support 85 on a ledge 98. It is urged into this position by a spring 99 which may conveniently be a coil spring coiled about the rivet 96 and engages the lever 94 and the base 11. However, when the long tongued spindle 13 is in place, as shown in Fig. 4, the lever 94 is turned away from the support 85 by the engagement of the tongue 83 with a lip 100 on the lever 94, thus moving the rod 103 to the left in Fig. 4. The rod 103 is preferably of circular cross section and has a portion 104 bent at approximately a right angle to the main body of the rod and extending through a hole in the lever 94. It may conveniently be secured in this position by a spring clip 105 or any other fastening device, such as a horseshoe washer.

Figure 7:
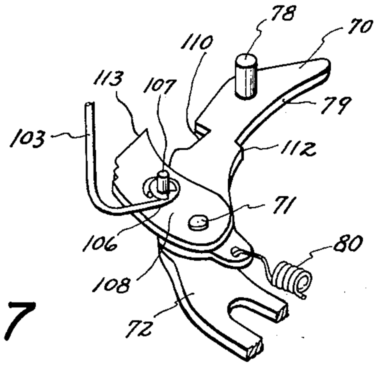
Fig. 7 is a partial view similar to Fig. 5 showing certain of the parts in a different operative position.

The other end of the rod is bent upward and at its end 106 encircles a pin 107 on a latch 108 pivoted on the same pin 71 that holds the positioning lever 70 to the L shaped member 72. The latch 108 is formed from a piece of sheet metal and has a lug 109 (Fig. 4) struck therefrom which engages a notch 110 in the positioning lever 70. The positioning lever 70 as best shown in Fig. 7 has a portion cut away to form the cam surface 79 which ends in a stop notch 112. The latch 108 in this figure is shown in the interest of clarity, considerably further retracted than is desirable. The notch 112 is positioned such that when the post 69 engages the notch 112, the pickup arm is directly above the starting groove of a seven inch record. The latch 108 extends over a portion of the cam surface 79, when it is in its normal position, as shown in Fig. 6, and therefore forms another notch between the corner 113 of the latch and the cam surface 79 somewhat displaced from the first notch 112. This latter notch at the corner of the latch 108 is positioned on the cam surface 29 in the same position as the notch in the aforesaid copending application and therefore is properly positioned to hold the pickup arm 17 above the starting groove of the ten or twelve inch records, depending upon the position of the cam 75.

It will be apparent that when the short tongued spindle 86 is used and the rod 103 is urged to the right in Fig. 4 by the spring 99, the latch 108 will be in the position shown in Figs. 2 and 6 and will therefore properly position the pickup arm 17 for ten or twelve inch records for which the spindle is proper.

On the other hand, when the long tongued spindle 13 is used, the latch 108 will be retracted, and the notch 112 is then the operative one providing a proper positioning of the pickup arm for a seven inch record, or any other desired size smaller than a 10-inch record.

While this record changer has been described in connection with twelve, ten and seven inch record, it is obvious that it could be easily adapted to other sizes, should such be built, merely by changing the proportions of the magazine and the notches.

Having thus described my invention, I am aware that numerous and extensive departures may be made therefrom without departing from the spirit or scope therefor.

I claim:

1. An automatic record changer comprising a base, a turntable rotatably mounted on said base, an ejector head mounted on said base adjacent said turntable, a pickup arm movably mounted on said base, operating means for said ejector head and said pickup arm including a positioning lever pivotally mounted on said operating means and formed with a notch adapted to be engaged by means connected to said pickup arm to hold said arm in its let-down position, latch means pivotally mounted on said positioning lever adapted to partially cover said notch and thereby to effectively change the let down position of said pickup arm, a linkage connected to said latch means including a lever pivotally mounted on said base and extending beneath the center of said turntable, said lever being formed and positioned to be engaged by a spindle extending through the center of said turntable by more than a specific distance.

2. In an automatic record changer having a turntable rotatably mounted on a base, a pickup arm and an ejector head mounted on said base beside said turntable and operating means adapted to operate said pickup and said ejector to control the raising, swinging and let-down of the pickup arm and the operation of the ejector; means for adapting said changer to play small diameter records comprising a spindle having a magazine portion that is offset towards said ejector head to accommodate and support said record, said spindle being removably mounted at the center of said turntable and provided with a tongue which extends below said base when the spindle is in position, linkage means pivotally mounted on said base and disposed in a position for engagement by said tongue and arranged to be moved to one predetermined position thereby, biasing means connected to said linkage arranged to move said linkage to another position when said spindle is removed, and latch means disposed on said operating means and connected to and operated by said linkage whereby the latch is moved to condition said operating means and its control of the pickup arm to cause the let-down position of said pickup arm to be altered.

3. In an automatic record changer adapted to play a plurality of sizes of records by selective use of a plurality of interchangeable spindles extending through the center of a turntable rotatably mounted on a base, said record changer having an ejector head and a pickup arm carried by the base adjacent the turntable and operating means for the pickup arm and the ejector head, including a positioning lever formed with a notch; means for changing the let-down position of said pickup arm to enable playing of different sizes of records comprising a lever pivotally connected at one end with said base below the central portion of the turntable and terminating under the center of the turntable whereby the free end of the lever is in position adapting it to be engaged and moved about its pivot to an adjusted position by the lower end of at least one of the spindles, latch means carried by the positioning lever of the operating means movable into and out of position to block the notch, said latch being connected to said lever and movable thereby to determine the let-down position of the pickup arm.

4. In a reproducer for records of differing types, the combination with a centrally apertured turntable and spindles having different key portions and interchangeably mounted in the aperture of the turntable for handling records of selected types, a plurality of stop means respectively effective for defining tone arm starting positions for records of the respective types for which such spindles are adapted, one of said stop means being movable to a retracted position, leaving another said stop means effective for tone arm positioning, and motion transmitting connections engageable by the key portion of one of said spindles for retracting said one stop, the key portions of another of said other spindles being out of range of engagement with said motion transmitting connections when mounted to leave said one stop means in an advanced position.

References Cited in the file of this patent

UNITED STATES PATENTS

| | | |
|---|---|---|
| 2,017,898 | Gates | Oct. 22, 1935 |
| 2,457,106 | Pressley | Dec. 21, 1948 |
| 2,490,678 | Dale | Dec. 6, 1949 |